United States Patent
Trumm et al.

(10) Patent No.: US 10,274,749 B2
(45) Date of Patent: Apr. 30, 2019

(54) PRODUCING MICROSTRUCTURED SPECTACLE LENSES BY MEANS OF TRANSFER LAYER

(71) Applicant: Rodenstock GmbH, Munich (DE)

(72) Inventors: Stephan Trumm, Munich (DE); Karl Huber, Regen (DE); Ferdinand Schreder, Zwiesel (DE); Erich Koell, Deggendorf (DE); Herbert Schuster, Emmering (DE); Reiner Beck, Bayreuth (DE); Herbert Zinner, Rohrbach (DE); Werner Mueller, Oetisheim (DE)

(73) Assignee: Rodenstock GmbH, Munich (DE)

( * ) Notice: Subject to any disclaimer, the term of this patent is extended or adjusted under 35 U.S.C. 154(b) by 548 days.

(21) Appl. No.: 14/435,010

(22) PCT Filed: Nov. 19, 2013

(86) PCT No.: PCT/EP2013/003485
§ 371 (c)(1),
(2) Date: Apr. 10, 2015

(87) PCT Pub. No.: WO2014/079559
PCT Pub. Date: May 30, 2014

(65) Prior Publication Data
US 2015/0293376 A1    Oct. 15, 2015

(30) Foreign Application Priority Data
Nov. 23, 2012    (DE) .................. 10 2012 023 025

(51) Int. Cl.
G02C 7/02       (2006.01)
G02B 5/18       (2006.01)
B29D 11/00      (2006.01)

(52) U.S. Cl.
CPC ........ *G02C 7/022* (2013.01); *B29D 11/00326* (2013.01); *G02B 5/1814* (2013.01); *G02B 5/1852* (2013.01); *G02B 5/1857* (2013.01)

(58) Field of Classification Search
CPC .... G02C 7/022; G02B 5/1857; G02B 5/1814; G02B 5/1852; B29D 11/00326
See application file for complete search history.

(56) References Cited

U.S. PATENT DOCUMENTS

| | | | |
|---|---|---|---|
| 5,116,112 A | 5/1992 | Rawlings | |
| 5,331,132 A | 7/1994 | Freeman et al. | |

(Continued)

FOREIGN PATENT DOCUMENTS

| | | |
|---|---|---|
| DE | 69833226 T2 | 9/2006 |
| DE | 102009011838 A1 | 9/2010 |

(Continued)

OTHER PUBLICATIONS

PCT International Search Report and Written Opinion for PCT/EP2013/003485, dated Feb. 26, 2014.

(Continued)

*Primary Examiner* — Robert J Grun
(74) *Attorney, Agent, or Firm* — Schiff Hardin LLP

(57) ABSTRACT

A method for producing a spectacle lens having in particular a diffractive microstructure on at least one lens surface. To this end, a thin structural support layer is initially made available, which on a surface has a microstructure. A lens main body is then cast to the microstructure of the structural support layer.

16 Claims, 2 Drawing Sheets

(56) References Cited

U.S. PATENT DOCUMENTS

| | | | |
|---|---|---|---|
| 5,589,983 | A | 12/1996 | Meyers et al. |
| 6,215,591 | B1 | 4/2001 | Ueda et al. |
| 6,491,851 | B1 | 12/2002 | Keller et al. |
| 6,590,709 | B1 | 7/2003 | Ori et al. |
| 7,298,554 | B2 | 11/2007 | Cho et al. |
| 7,561,333 | B2 | 7/2009 | Takasu et al. |
| 2004/0095552 | A1 | 5/2004 | Kim |
| 2005/0162733 | A1 | 7/2005 | Cho et al. |
| 2011/0210368 | A1 | 9/2011 | Jeong et al. |
| 2012/0061863 | A1 | 3/2012 | Cox et al. |
| 2013/0229619 | A1 | 9/2013 | Becken et al. |
| 2013/0235337 | A1 | 9/2013 | Becken et al. |
| 2013/0261782 | A1 | 10/2013 | Becken et al. |

FOREIGN PATENT DOCUMENTS

| | | |
|---|---|---|
| DE | 102010051627 A1 | 5/2012 |
| DE | 102010051637 A1 | 5/2012 |
| DE | 102010051645 A1 | 5/2012 |
| DE | 102010051762 A1 | 5/2012 |
| EP | 0496544 A2 | 7/1992 |
| JP | H02-134612 A | 5/1990 |
| JP | 2005-107298 A | 4/2005 |

OTHER PUBLICATIONS

Office Action dated Oct. 28, 2016 for Japanese Patent Application No. 2015-543334 (with English translation).

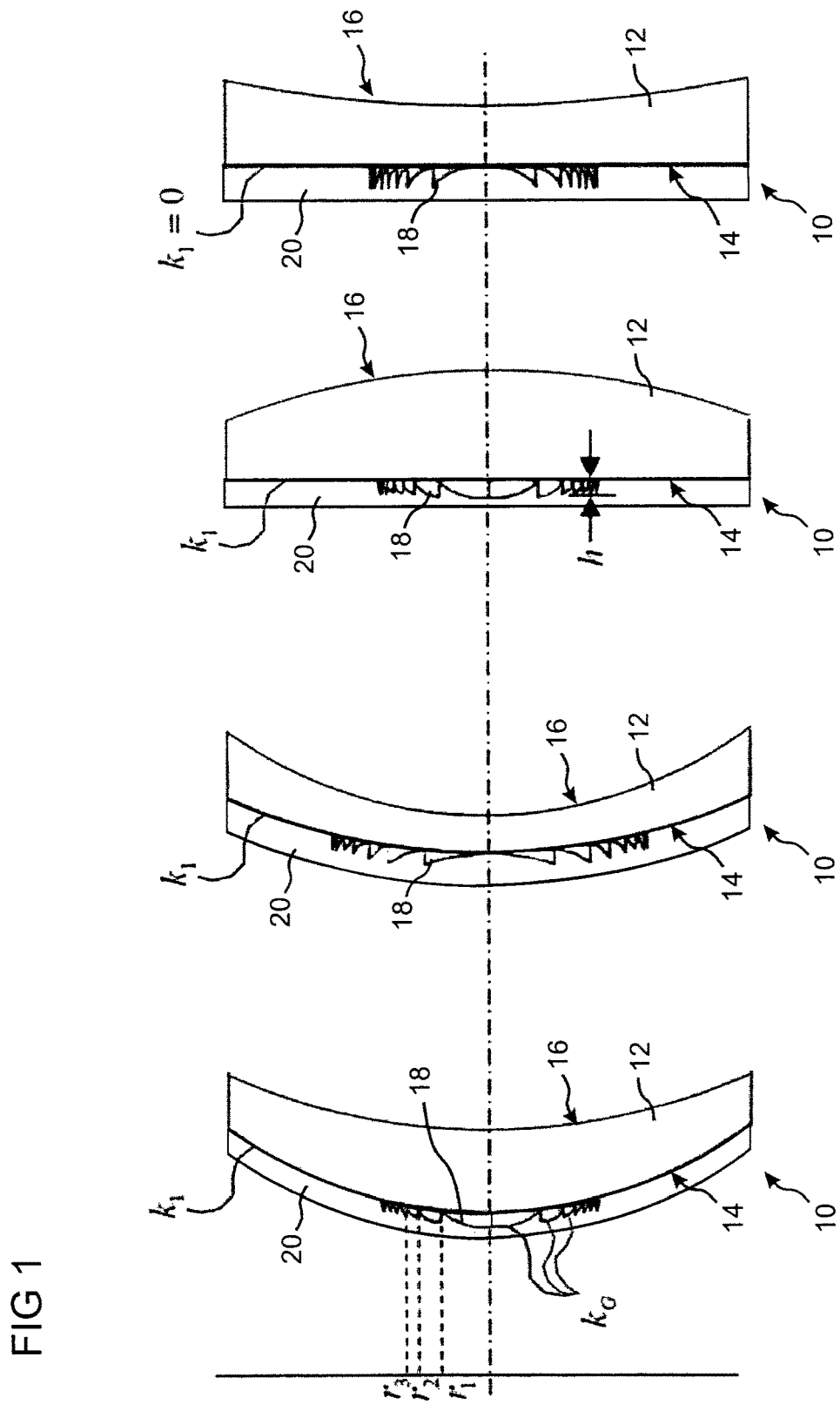

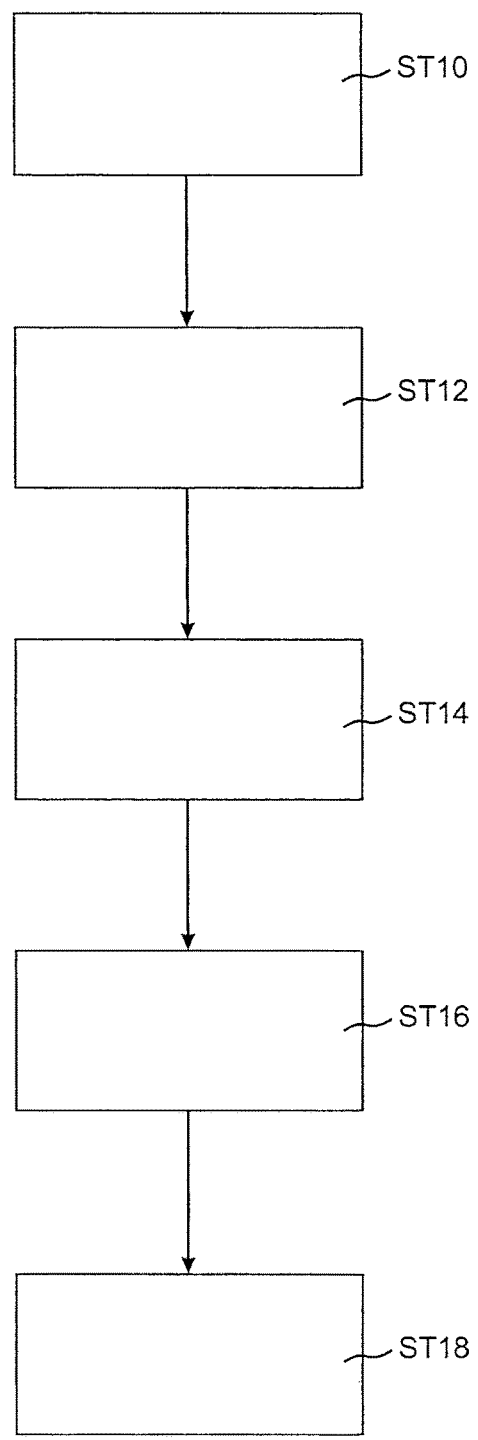

PRODUCING MICROSTRUCTURED SPECTACLE LENSES BY MEANS OF TRANSFER LAYER

The present invention relates to a method for producing a lens, in particular a spectacle lens, having in particular a diffractive microstructure on at least one lens surface.

Diffractive optics often utilize a combination of a refractive and a diffractive effect on at least one surface or boundary surface. In this way, very good image qualities can be achieved with comparatively few lens elements, even in complex optics with high functional density. Primarily in applications in which only a single lens is used, a combination of refractive and diffractive effects can reduce imaging errors which otherwise can be suppressed only by multilayer lenses or by lenses having refractive index gradients. In particular for lenses such as spectacle lenses, which are composed of a dispersing material, diffractive microstructures are occasionally used on a lens surface in order to reduce, for example, color fringes caused by chromatic errors of the lens. Some examples of a design of diffractive structures for color fringe correction are known, for example, from DE 10 2010 051 627 A1, DE 10 2010 051 637 A1, DE 10 2010 051 645 A1 and DE 10 2010 051 762 A1.

However, one of the challenges when using diffractive structures is the high manufacturing complexity thereof. In particular for manufacturing rotationally symmetrical structures, material-removing machining methods (e.g., diamond turning) have become established. The lens to be produced can be machined directly, or a casting mold or a punch is machined in order to form therein a negative of the microstructure to be provided on the lens, which microstructure is then transferred on to the respective lens surface by casting the lens or by punching and/or embossing.

However, depending on the lens material, it is not always possible to use all structuring methods. For example, thermosetting materials (e.g., Perfalit 1.67) are commonly used as basic materials for lenses, in particular spectacle lenses. However, this class of polymers resists subsequent (thermal) deformation in many cases. Also, subsequent machining or lithographic processing is often hardly possible, or is only possible with unsatisfactory structure quality or with considerable effort. In many cases it is therefore advantageous, or even the only technologically reasonable possibility, to incorporate the microstructure into the volume material in the course of casting a lens, in particular a spectacle lens. For this purpose, the initially liquid (or viscous) volume material has to be cured (e.g., by polymerization of monomers). Subsequently, the microstructured casting mold can be used for producing the next lens.

It is an object of the present invention to simplify the production of lenses, in particular of spectacle lenses, having in particular a diffractive microstructure on at least one lens surface. This object is achieved by a method having the features disclosed in claim 1. Preferred embodiments are the subject matter of the dependent claims.

Thus, the invention provides a method for producing a lens, in particular a spectacle lens, having a microstructure on at least one lens surface. The microstructure serves in particular as a diffractive grating for visible light, preferably for color fringe correction in a spectacle lens. In the case of a spectacle lens, the microstructure is particularly preferably provided on the front surface of the spectacle lens. According to the invention, first, a structure carrier layer (also designated as structure carrier film) is provided, which has a microstructure on a surface. This microstructure corresponds in particular to the negative of the microstructure to be formed on or in the lens. A lens main body, in particular the lens actually to be produced, or a lens blank which later is further processed to form the actual lens, is then cast on the microstructure of the structure carrier layer.

The structure carrier layer can remain on the lens or the lens main body at least until the lens or the lens main body is cured. During the casting of the lens main body, the structure carrier layer can be disposed with the surface facing away from the microstructure on a support substrate. Thus, the support substrate together with the structure carrier layer serves as a casting mold for casting the lens main body, wherein the support substrate serves in particular for supporting the particularly flexible structure carrier layer, which is preferably thinner than the support substrate. Thus, the structure carrier layer preferably has a smaller thickness and/or a lower material strength or material hardness than the support substrate.

Overall, a structure carrier layer, which preferably together with a support substrate is used as a casting mold for the lens, can be produced, in particular microstructured, much more easily and thus also more cost-effectively than a conventional solid casting mold by casting in a mold, dip molding, spinning, sputtering or embossing, for example. For this purpose, in particular such materials can be used which can be microstructured in a simple manner by casting in a mold, and/or by dip molding and/or spinning and/or sputtering or coating by vapor deposition and/or by forming or embossing. The tools necessary for microstructuring the structure carrier layer, the production of which tools could be comparatively complex and therefore costly, are available again for further production steps after the comparatively simple production of the structure carrier layer.

A cycle time of these tools is therefore comparatively short, in any case compared with possibly similarly expensive conventional casting molds for casting lenses, which have to remain at the lens to be produced until the lenses are cured. This process typically can take several hours up to a few days and requires a correspondingly long cycle time of the conventional microstructured casting molds.

In contrast, the structure carrier layer in the method according to the invention can remain on the lens main body at least until the lens to be produced is cured, without blocking much more expensive tools. Even if a non-microstructured support substrate is used and likewise remains on the lens to be produced until the lens main body is cured, this reduces the costs significantly with respect to conventional methods, since the support substrate without a microstructure can be produced much more cost-effectively and therefore in larger quantities. The structure carrier layer, which likewise is significantly more cost-effective compared with conventional microstructured casting molds, could even be discarded or worn out after only a few casting cycles. It would also be possible to use the structure carrier layer in each case only once and to dispose of it thereafter. Particularly preferably, the structure carrier layer remains on the lens as a protective layer, at least during the subsequent machining of the lens or even during the later use in order to protect the microstructure against damage or soiling. Due to their dimensions (typically 0.3-5 μm axially, 1-500 μm laterally), the aforementioned microstructures are susceptible to soiling and scratching. The latter applies in particular if the structure is applied on comparatively soft organic materials. It is therefore advantageous to protect this structure in the finished product (lens) as well as during the manufacture.

In particular if a support substrate for supporting the structure carrier layer is used during casting of the lens main body, the method comprises removing the support substrate from the structure carrier layer, preferably after casting, in particular after at least partial curing of the lens main body, while the structure carrier layer remains on the lens main body.

The structure carrier layer preferably has a maximum thickness of not more than approximately 1 mm, particularly preferably not more than approximately 0.5 mm, most preferably not more than approximately 0.25 mm. Particularly preferably, the structure carrier layer has a substantially constant layer thickness. In other preferred embodiments, even thinner layers having thicknesses of several 10 micrometers (e.g., approximately 20-40 µm) can be used, which, can be produced in particular by means of methods such as, for example, spin coating or dip molding.

In a particularly preferred embodiment, the structure carrier layer has a (maximum) thickness which is less than a (minimum) thickness of the lens main body. Even if the structure carrier layer is produced by casting using a (conventional) casting mold, the structure carrier layer, due to the low thickness, cures much faster than a lens having a thickness of the lens to be produced or of the lens main body. Thus, the cycle time of the costly (conventional) casting mold remains very short. Moreover, other processes for producing the structure carrier layer, by means of which the cycle time of the microstructured tools can be reduced further, can also be used with the invention, as will be explained later.

In a preferred embodiment, the structure carrier layer has a refractive index which differs from the refractive index of the lens main body. In this manner, the structure carrier layer can remain as a protective layer on the lens main body and can prevent the microstructure (in particular in the form of a diffractive grating) from being damaged by subsequent process steps of the lens production, or from being soiled during these processes. Due to the difference in the refractive index, the microstructure remains optically effective; in particular, the microstructure can act as a diffractive grating (in particular for visible light).

The structure carrier layer is in particular provided with sufficient optical transparency, for example to allow the lens including the structure carrier layer to be used, as a spectacle lens. In this case, the structure carrier layer preferably remains as a protective layer on the spectacle lens, and therefore can also protect the microstructure against damage and soiling during subsequent work steps at the optician (e.g., edging the spectacle lenses) as well as when wearing the finished spectacles.

On the side of the structure carrier layer facing away from the microstructure, the structure carrier layer preferably has a largely smooth surface which in particular does not follow the topography of the microstructure, but merely follows the overall curvature of the lens to be produced, in particular of the spectacle lens. This substantially smooth surface of the structure carrier layer is therefore significantly less sensitive to damage or soiling. Moreover, this provides the possibility to apply in a simple manner additional layers (e.g., anti-reflection layers, top coatings, hard coatings), which could not be (as easily) applied on the non-flat surface of the microstructure or which could negatively influence the effect thereof.

If the structure carrier layer remains as a protective layer on the lens, the structure carrier layer and the optical properties thereof—in particular the refractive index—are already taken into account during the design of the microstructure. A difference between the refractive index of the structure carrier layer and the refractive index of the lens main body (for visible light) is preferably at least approximately 0.05, preferably at least approximately 0.1, more preferably at least approximately 0.15 and most preferably at least approximately 0.2. Thus, for example, the lens main body could have a refractive index of approximately 1.6, whereas the structure carrier layer is provided with a refractive index of approximately 1.5. In another example, the refractive index of the lens main body could be approximately 1.67, whereas the structure carrier layer is provided with a refractive index of approximately 1.6. In order to achieve a greater difference in the refractive index, the lens main body could have, for example, a refractive index of 1.67, whereas the structure carrier layer is provided with a refractive index of approximately 1.5. For an even greater difference in the refractive index, an exemplary combination with a refractive index of approximately 1.74 for the lens main body and approximately 1.5 for the structure carrier layer is also possible.

Furthermore, it is preferred if the material of the structure carrier layer is optically clear and—unless otherwise desired—is uniformly transparent in the visible range of light. The structure carrier layer itself does not have to be particularly hard, since an additional hard coating can be applied; however, the structure carrier layer preferably should nevertheless ensure sufficient adhesive strength and wear resistance for further processing. A lower hardness of the structure carrier layer facilitates the simpler production of the microstructure. The material strength should be just high enough to enable the casting of the lens main body without damaging the microstructure.

Although high hardness is not necessary (e.g., when using Transshade with/without photochromic), in a preferred embodiment (e.g., when using TS56T), the transfer layer likewise constitutes the hard coating.

While the structure carrier layer on the surface facing the lens main body follows the topography of the microstructure, this microstructure is preferably not reproduced on the side of the structure carrier layer that faces away from the lens main body. The surface of the structure carrier layer facing away from the lens main body preferably has a geometry in which the structure carrier layer substantially follows (particularly preferably equidistantly) the shape of the corresponding surface of the lens to be produced (thus, for example, a spherical surface, an aspherical but rotationally symmetrical surface, or a freeform surface) without reproducing the structure. Furthermore, on the side facing away from the microstructure, a structure carrier layer that is smooth or a structure carrier layer that meets special requirements (e.g., defined roughnesses for improving adhesion of the subsequent layer) is preferred.

The thickness of the layer is preferably selected such that it is greater than the wavelength of the light used. However, if other (optical) effects are to be achieved by the microstructure (e.g., generating an effective refractive index), the thickness can be designed according to these requirements. The structure carrier layer particularly preferably has a thickness of at least approximately 5 µm, preferably at least approximately 20 µm, particularly preferably at least approximately 100 µm, most preferably at least approximately 200 µm. Thus, in particular interference phenomena (mainly Fabry-Perot interferences) within the structure carrier layer are effectively suppressed or prevented. This can be explained by the fact that at these layer thicknesses, the typical coherence length of the usual ambient light becomes (at least in part) shorter than the layer thickness, as a result of which interference effects become negligible. When specifying the thickness, the stability of the material as well as process-related circumstances have to be taken into account, which can result in considerably greater thicknesses of up to 500 µm or even more than 1 mm.

As already mentioned, providing the structure carrier layer preferably comprises casting the structure carrier layer by means of a casting mold that has a correspondingly microstructured casting mold surface. Thus, the structure carrier layer is preferably cast between two casting molds, one of which includes the structure. The advantage of this method is that it enables very accurate control of the geometry. In the case of an adequately small thickness of the structure carrier-layer, the structure carrier layer cures significantly faster than a thick lens, which is why the part of the casting mold provided with the microstructured casting mold surface can be used again much earlier. Thus, the result is a much shorter cycle time than would be usual in conventional casting methods for lenses.

In order to protect the potentially sensitive structure carrier layer (film), in one preferred embodiment, the casting mold located on the side of the structure carrier layer that faces away from the structure remains as the already-described support substrate on the structure carrier layer. The packet made up of a casting form (or support substrate) and a structure carrier film (structure carrier layer) is then used as the casting mold for casting the volume material (lens main body). When there is sufficient stability (or thickness), the structure carrier film can also be used directly as the casting mold.

From the described casting mold packet which includes the microstructure, and a conventional casting mold which reproduces the shape of the side of the lens to be produced or of the blank to be produced that faces away from the microstructure, a casting packet is preferably prepared. The initially liquid volume material is then introduced into this casting packet or a device suitable for casting and is cured (e.g., by polymerization of monomers).

To avoid bubble formation during the curing process it can be advantageous to store the casting packet of the volume material in a horizontal position for the curing.

In a further preferred embodiment, providing the structure carrier layer comprises a dipping process in which a correspondingly microstructured punch is held in a dipping bath, so that the structure carrier layer is deposited on the punch. In a further preferred embodiment, providing the structure carrier layer comprises spinning and/or sputtering the structure carrier layer onto a microstructured substrate and/or coating a microstructured substrate by vapor deposition. Similar to a casting method for the structure carrier layer, the structure carrier layer, in particular in the case of an adequately low thickness of the structure carrier layer, can cure significantly faster than a thick lens, which results in correspondingly short cycle times for the corresponding microstructured tools (punch or substrate).

In a further preferred embodiment, providing the structure carrier layer comprises forming the microstructure by shaping, in particular embossing and/or punching, and/or by a material-removing machining process (e.g., diamond turning) and/or by laser ablation and/or by injection molding. With sufficiently formable material for the structure carrier layer, the structure carrier layer can be produced in a very simple and cost-effective manner, especially by embossing, injection molding or punching, since the requirements placed on the hardness or material strength of the structure carrier layer are significantly less demanding than those placed on conventional microstructured casting molds.

Shaping can in particular also be supported thermally. In the case of machining using laser technology (e.g., laser ablation), the structure can be smoothed in a second process. This is preferably carried out by fusion by means of laser systems.

In particular if the structure carrier layer remains as a protective layer on the lens main body, the method, preferably after the casting and in particular after an at least partial curing of the lens main body, comprises a mechanical machining (e.g., grinding, polishing, roughening) of the surface of the structure carrier layer that faces away from the microstructure.

In one aspect, the invention solves the problem of the long cycle time in particular in that the structure (e.g., diffractive microstructure) is not directly cast into the volume material of the lens to be produced, but instead is first cast as a negative into a specie carrier layer (structured support layer), and the volume material (lens main body) is cast on this layer in a second step. Since the structure carrier layer is in particular a different material system, or since a different material system can be used than for the volume material, and since special methods can be used for curing the structure carrier layer (e.g., thermally or UV-assisted polymerization), which methods are possibly not appropriate for the volume material, and because this structure carrier layer can in particular be significantly thinner (preferably 1-200 µm) than the volume material (typically several millimeters), the curing process during casting of the structure thus can be carried out significantly faster (several minutes rather than several hours up to a few days) than by directly casting into the volume material.

In a preferred embodiment, the structure carrier layer is maintained as a protective layer after casting of the volume material, and is therefore capable of performing the task of implementing a refractive index jump (for example, when using the structure for generating a diffractive effect) and is also capable of performing the task of protecting the structure against damage and/or soiling. An advantage of this approach is that curing the volume material (lens main body) results in a particularly strong and optically flawless connection of the two elements. This is facilitated, inter alia, by the fact that additives, which otherwise are necessary for separating the product from the structured casting mold, can be dispensed with. In addition, soiling of the structure in one of the two elements or along the boundary can be effectively avoided by the direct sequential arrangement. Furthermore, due to the reduction of the necessary process steps, this method is particularly economical. The structure carrier layer thus can serve as protection during individual further or all process steps and can be removed in the process chain at the appropriate time. As an alternative, the structure carrier layer can also be integrated into the spectacle lens as an integral part for the protection of the product during use, e.g., by a spectacle wearer.

In a preferred embodiment, the method for producing a microstructured lens comprises machining the surface of the volume material (lens) that faces away from the microstructure. In this step, the side facing away from the microstructure is provided with the desired surface geometry and surface quality. This step can in particular be omitted if this side requires no further processing. This is the case, for example, if this side is already present with the desired geometry and quality after casting.

If machining is carried out, techniques such as milling-grinding-polishing (traditional RGF) or "cut to polish" or turning-polishing are preferably used here. For this purpose, the blank is usually blocked. To this end, adhesive films or special lacquer layers in combination with low-melting metal alloys as well as base supports in combination with adhesive films or adhesives can be used. When selecting the adhesive or the lacquer, it should be ensured that the adhesive or the lacquer adheres with sufficient strength to the structure carrier layer (or the volume material or a temporary protective layer) in order to securely hold the blank and, on the other hand, so that the blank can be detached therefrom after machining without destroying these layers or the volume material. After deblocking and prior to further processing, the structure carrier layer or the volume material is to be cleaned and/or smoothed, if necessary.

In another preferred, embodiment, the structure carrier layer is separated (detached) from the lens main body after deblocking. This is particularly advantageous in that a very good mechanical connection between the block and the structure carrier layer, and therefore a very good fixation of the entire lens or the blank, can be achieved for the blocking without having to care about avoiding lasting damage to the structure carrier layer. In particular, one is not limited to connecting mechanisms or connecting materials that can be detached without residue.

Although in some of the described preferred embodiments, the structure carrier layer can be used as a protective layer during some or all subsequent process steps or even for the finished product, in other preferred embodiments, the structure carrier layer can also be removed, and thus separated from the lens main body, directly after casting the lens main body (or after it is at least partially cured). For removing the structure carrier layer, chemical methods (e.g., dissolving in acidic or alkaline media; use of organic solvents; support by ultrasound, etc.) can also be used in addition to mechanical methods (e.g., peeling off).

In particular if the structure carrier layer is even intended to remain in the finished product (e.g., spectacle lens), the structural layer is preferably machined directly or indirectly after the casting of the lens main body on the side that faces away from the microstructure (and thus the lens main body). Irrespective of whether the structure carrier layer is to be detached or maintained, alternatively or additionally, the side of the lens main body facing away from the microstructure can also be machined, preferably in an analogous manner. In particular, further layers (e.g., adhesive layers, hard coatings, AR layers, water- or dirt-repellent layers) can be applied, or the lens (the spectacle lens) can be colored. This step can be omitted if no further layers are desired.

In particular if the structure carrier layer is to be maintained at least temporarily or even in the finished product, the side of the structure carrier layer that faces away from the microstructure obtains the desired surface geometry and quality by machining after the casting of the lens body. This step preferably will take place after the casting of the volume material or after the machining of the surface of the volume material that faces away from the structure. The following aspects and processes are given as examples for this:

Surface Quality (e.g., Roughness)

This relates, for example, to the roughness of the surface of the aforementioned side of the structure carrier layer. Thus, the surface can be treated mechanically or chemically (e.g., polished) in order to obtain the desired surface properties. Such properties can relate to the optical quality, specific properties for improving layers to be applied or the hardness, for example.

Geometry (Shape and Thickness)

The geometry of the aforementioned side of the structure carrier layer after the generating, the structuring, the casting or the machining of the volume material does not have to correspond to the desired surface of the support layer in the finished product. In this case, the desired geometry has to be implemented by mechanical or chemical treatment (e.g., grinding or etching) as a separate process step at the appropriate position (e.g., after demolding the support layer) in the overall process. An example for this would be an undefined geometry, as can be present after the spinning (when producing the structure carrier layer). Also, the structure carrier layer can be intentionally produced with a greater thickness in order to increase the stability during the casting step (casting the volume material) or during demolding. It is also possible to use a curvature or a flat casting mold other than that desired for the product.

The invention is described hereinafter by means of preferred embodiments with reference to the accompanying drawings. In the figures:

FIG. 1 shows schematic illustrations of lenses (spectacle lenses or lens blanks) having a diffractive microstructure on a first surface, which were produced using a method according to a preferred embodiment of the present invention; and FIG. 2 shows a schematic illustration of individual method steps in a production method according to a preferred embodiment of the present invention.

FIG. 1 illustrates examples of spectacle lenses 10 exhibiting different effects and surface curvatures. A spectacle lens body 12 (lens main body) has in each case a front surface 14 and a back surface 16 (eye-side surface). A diffractive microstructure 18 is formed in each case on the front surface 14. The illustration of the diffractive microstructure 18 is to be regarded as purely schematic. In particular, the respective microstructure 18 is not illustrated true to scale. Usually, the microstructure 18 is significantly smaller than the lens main body 12. Typical dimensions of diffractive microstructures preferably range from approximately 0.3 to 5 µm in the axial direction (thus, in the thickness direction of the spectacle lens) and from approximately 1 to 500 µm in the lateral direction. From left to right, FIG. 1 successively shows as an example a plus lens having a convex base curvature (front surface 14), a minus lens having a convex base curvature (front surface 14), a plus lens having a planar base curvature (front surface 14) and a minus lens having a planar base curvature (front surface 14).

Depending on the embodiment of a method according to the invention, the spectacle lenses 10 in FIG. 1 can be regarded as a final product or an intermediate product (e.g., a blank). Thus, FIG. 1 illustrates the spectacle lenses 10 with a structure carrier layer 20 which is arranged on the front surface 14 of the lens main body 12, and which can remain in place as a protective layer in the final product or at least temporarily during the further machining of a blank, or is removed directly or indirectly after casting or (at least partial) curing of the lens main body. Like the microstructure 18, the structure carrier layer 20 in FIG. 1 is not illustrated true to scale. The structure carrier layer is preferably significantly thinner than the lens main body 12. Thus, the structure carrier layer 20 is preferably thinner than approximately 1 mm, more preferably not thicker than approximately 0.5 mm and even more preferably not thicker than approximately 0.2 mm. In some preferred embodiments, the structure carrier layer is not thicker than approximately 0.1 mm or not thicker than even approximately 50 µm. However, the structure carrier layer 20 is preferably at least thick enough that it defines the microstructure 18 completely so as to thereby serve as a casting mold surface for the casting of the lens main body 12.

Thus, first the structure carrier layer 20 with the microstructure 18 formed therein is produced so as to subsequently cast the lens main body on the structure carrier layer. In a preferred embodiment, the structure carrier layer 20 is removed afterwards from the lens main body 12. In another preferred embodiment, the structure carrier layer 20 remains on the lens main body 12 during the entire further processing of the spectacle lens blank, in particular up to the finished spectacle lens, in particular up to the finished spectacles, and covers and. thus protects the microstructure 18.

FIG. 2 schematically illustrates a method for producing a lens having a microstructure on at least one lens surface, according to a preferred embodiment of the invention. In this preferred embodiment, a structure carrier layer is first cast in a step ST10 by means of a primary microstructured casting mold in such a manner that the structure carrier layer has on one side a negative of the microstructure of the lens to be produced. The primary microstructured casting mold has substantially a positive of the microstructure of the lens to be produced.

In a further step ST12, the structure carrier layer cast in this manner is demolded after the curing thereof, at least on the microstructured side. The other shell mold (on the side of the structure carrier layer that faces away from the microstructure) preferably remains in place as a support substrate for the stabilization of the structure carrier layer. Thus, the structure carrier layer together with the support substrate forms a microstructured first casting shell mold which, in turn, together with an in particular non-microstructured second casting shell mold, forms a secondary casting mold by means of which a lens main body of the lens to be produced can be cast. This, in turn, takes place in step ST14.

After the curing of the lens main body, the resulting lens or lens blank is demolded in step ST16. For this purpose, in particular the non-microstructured shell mold is detached from the main lens body and the support substrate is detached from the structure carrier layer, wherein the structure carrier layer preferably remains connected to the lens main body. In another preferred embodiment, the structure carrier layer (in particular together with the support substrate) could also be separated from the lens main body.

In the preferred embodiment illustrated in FIG. 2, the method also comprises a step ST18 of a further processing operation on the side of the lens main body that faces away from the microstructure (in particular a back surface of a spectacle lens to be produced) and/or on the structure carrier layer (in particular a front surface of a spectacle lens to be produced). This processing operation comprises in particular a mechanical machining, in particular milling and/or grinding and/or polishing the back surface of a spectacle lens, in particular of an individually manufactured progressive lens. For this purpose, a holding element (block) is preferably fastened on the surface of the structure carrier layer that faces away from the microstructure to allow the lens blank (spectacle lens blank) to be precisely held or manipulated. The block is removed in particular after completion, of all machining steps for which the block is used. Alternatively or additionally, the further processing operation in step ST18 comprises a refining of the lens (the spectacle lens) in particular by depositing one or more further functional layers, in particular a hard coating and/or an adhesive layer and/or an AR layer and/or a hydrophobic and/or lipophobic layer and/or a coloring layer. If this (these) further layer(s) is (are) to be deposited only on the back surface (second surface) of the spectacle lens, this can also be carried out as long as the spectacle lens blank is still blocked. However, if further coating of the front surface is to be carried out, this further coating is preferably applied directly or indirectly on the structure carrier layer.

In particular when producing a spectacle lens, the spectacle lens is also edged, wherein the structure carrier layer preferably also remains intact as a protective layer for this purpose and for the subsequent use of the spectacle lens.

Hereinafter, specific examples of preferred materials for the lens main body and for the structure carrier layer are specified. These materials are particularly advantageous if the structure carrier layer (in particular in the case of a spectacle lens) is to be maintained as a protective layer in the final product. For the lens main body, thus, the main component of the lens to be produced, which is obtained from a lens blank, in particular the following materials are suitable:

Perfalit 1.5
  chemical designation: polyethylene glycol bis(allyl carbonate)
  basis is CR 39 (Columbia Resin 39) from PPG
  refractive index 1.5; Abbe number 58
  thermoset
PCM 1.54 (photochromic)
  chemical designation: copolymers containing, among others, polyethylene glycol dimethacrylate
  refractive index 1.54; Abbe number 43
  thermoset
Polycarbonate
  refractive index 1.59; Abbe number 29
  absolutely unbreakable! (sports and children's sector)
  poor solvent resistance (alcohol, acetone)
  thermoplast
Perfalit 1.6
  chemical designation: polythiourethane
  refractive index 1.60; Abbe number 41
  thermoset
Perfalit 1.67
  chemical designation: polythiourethane
  refractive index 1.67; Abbe number 32
  thermoset
Perfalit/Cosmolit 1.74
  chemical designation: polyepisulfide
  refractive index 1.74; Abbe number approximately 32
  thermoset In particular in connection with one or more of the above-mentioned preferred materials of the lens main body, one or more of the following materials are preferably used for the structure carrier layer:

TS56T from Tokuyama:
  This lacquer having a refractive index of 1.49 is used for conventional spectacle lenses, preferably for Perfalit 1.5. Through an immersion process, thicknesses of about 2.2 µm are preferably obtained.
IM-9200 from SDC Technologies:
  This lacquer has a refractive power between 1.585 and 1.605 and, in the case of conventional spectacle lenses, is applied on Perfalit 1.6 and 1.67, preferably after a surface activation. Through dipping processes, thicknesses of about 2.8 µm are preferably achieved. Variations of from 1.5 µm to 3.2 µm are possible.
Transhade from Tokuyama:
  This is preferably a photochromic lacquer system. Thicknesses between 30 µm and 50 µm are preferably achieved by means of spin coating. Typical thicknesses are approximately 39 µm. Moreover, casting processes by means of which thicknesses of more than 200 µm can be achieved could also be used. This lacquer is also available without photochromic colorings, and can be cured thermally and also by UV irradiation.

Hi Guard 1080 from PPG and products from Tokuyama

These lacquers could be used as an alternative to TS56T (3) from Tokuyama for applying to Perfalit 1.5.

Fused quartz

Further preferred materials for the structure carrier layer, which are particularly suitable for injection molding, are polycarbonate and PMMA. Other materials that are suitable for injection molding can also be used in preferred embodiments which utilize injection molding. "Casting" within the meaning of a described preferred provision of the structure carrier layer thus also includes in particular injection molding.

It is particularly preferred to combine a structure carrier layer having a refractive index as low as possible (low refractive index $n_S$) with materials for the lens main body having a refractive index as high as possible (high refractive index of the spectacle lens body $n_K$ in particular including the microstructure). A refractive index jump that is as high as possible is thereby achieved. Preferred combinations are, for example, $n_S=1.5$ on $n_K=1.6$ or on $n_K=1.67$ or on $n_K 1.74$, etc., but also $n_S=1.6$ on $n_K=1.67$ or on $n_K=1.74$, etc., but also $n_S=1.67$ on $n_K=1.74$, etc. Particularly preferred are combinations having an even higher difference in the refractive index, in particular at least 0.2 or higher.

REFERENCE LIST 10 spectacle lens (blank)
12 spectacle lens body (lens main body)
14 front surface (base curvature) of the spectacle lens
16 back surface of the spectacle lens
18 microstructure
20 structure carrier layer

The invention claimed is:

1. A method for producing a lens having a diffractive microstructure on at least one lens surface, comprising:
   providing a structure carrier layer, which on a surface has a diffractive microstructure, wherein the structure carrier layer is disposed with a side facing away from the diffractive microstructure on a support substrate which, together with the structure carrier layer, is used as a casting shell mold for casting a lens main body;
   casting the lens main body to the diffractive microstructure of the structure carrier layer; and
   detaching the support substrate from the structure carrier layer after the casting of the lens main body, wherein the structure carrier layer remains on the lens main body.

2. The method according to claim 1, wherein the structure carrier layer is provided with a maximum thickness of not more than 1 mm.

3. The method according to claim 1, wherein the structure carrier layer has a thickness that is less than a thickness of the lens main body.

4. The method according to claim 1, wherein the structure carrier layer has a refractive index that differs from the refractive index of the lens main body.

5. The method according to claim 1, wherein providing the structure carrier layer comprises casting the structure carrier layer by means of a casting mold that has a correspondingly microstructured casting mold surface.

6. The method according to claim 1, wherein providing the structure carrier layer comprises a dipping process in which a correspondingly microstructured punch is held in a dipping bath, such that the structure carrier layer is deposited on the punch.

7. The method according to claim 1, wherein providing the structure carrier layer comprises one or more of spinning the structure carrier layer on a microstructured substrate, sputtering the structure carrier layer on a microstructured substrate, or coating a microstructured substrate by vapor deposition.

8. The method according to claim 1, wherein providing the structure carrier layer comprises forming the diffractive microstructure by one or more of embossing, punching, material-removing machining, or laser ablation.

9. The method according to claim 1, further comprising:
   mechanical machining the surface of the structure carrier layer facing away from the diffractive microstructure after the casting of the lens main body.

10. The method according to claim 1, wherein the structure carrier layer is provided with a maximum thickness of not more than 0.5 mm.

11. The method according to claim 1, wherein the structure carrier layer is provided with a maximum thickness of not more than about 0.25 mm.

12. The method according to claim 1, wherein the diffractive microstructure includes a grating for visible light, the grating being configured to correct color fringe in a spectacle lens.

13. The method according to claim 1, wherein the lens main body is associated with a spectacle lens.

14. The method according to claim 13, wherein the act of casting the lens main body to the diffractive microstructure of the structure carrier layer includes casting a surface of the spectacle lens, which is opposite to an eye-side surface of the spectacle lens, to the diffractive microstructure of the structure carrier layer.

15. The method according to claim 1, wherein the diffractive microstructure is completely covered by the structure carrier layer.

16. A method for producing a spectacle lens having a microstructure on at least one lens surface, comprising:
   providing a structure carrier layer with a maximum thickness of not more than 1 mm, which on a surface has a microstructure, wherein the structure carrier layer is disposed with the side facing away from the microstructure on a support substrate which, together with the structure carrier layer, is used as a casting shell mold for casting a lens main body;
   casting the lens main body of the spectacle lens to the microstructure of the structure carrier layer; and
   detaching the support substrate from the structure carrier layer after the casting of the lens main body, whereas the structure carrier layer remains on the lens main body.

* * * * *